Feb. 9, 1943.  D. E. LARSON  2,310,447
VACUUM RELIEF VALVE
Filed Feb. 20, 1942
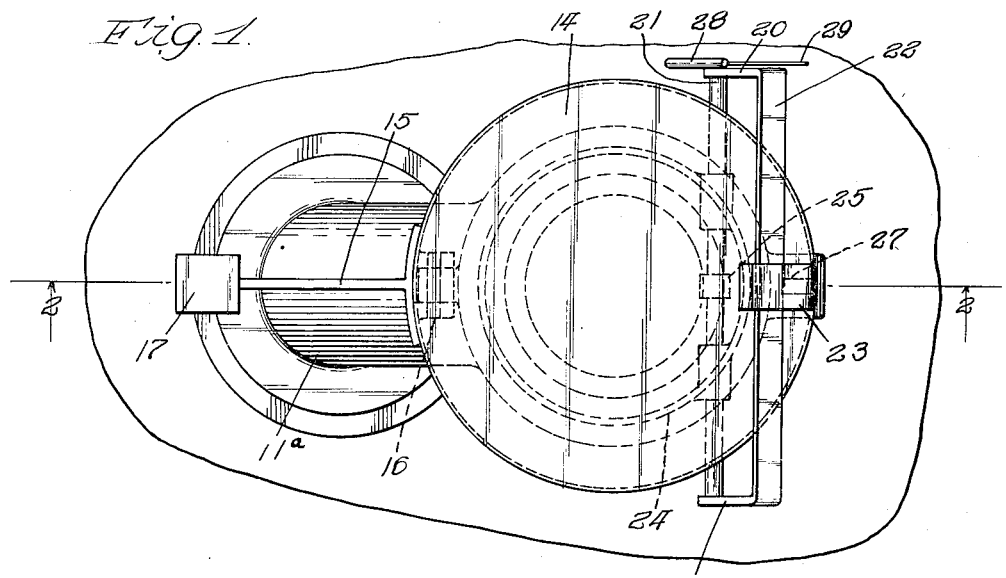
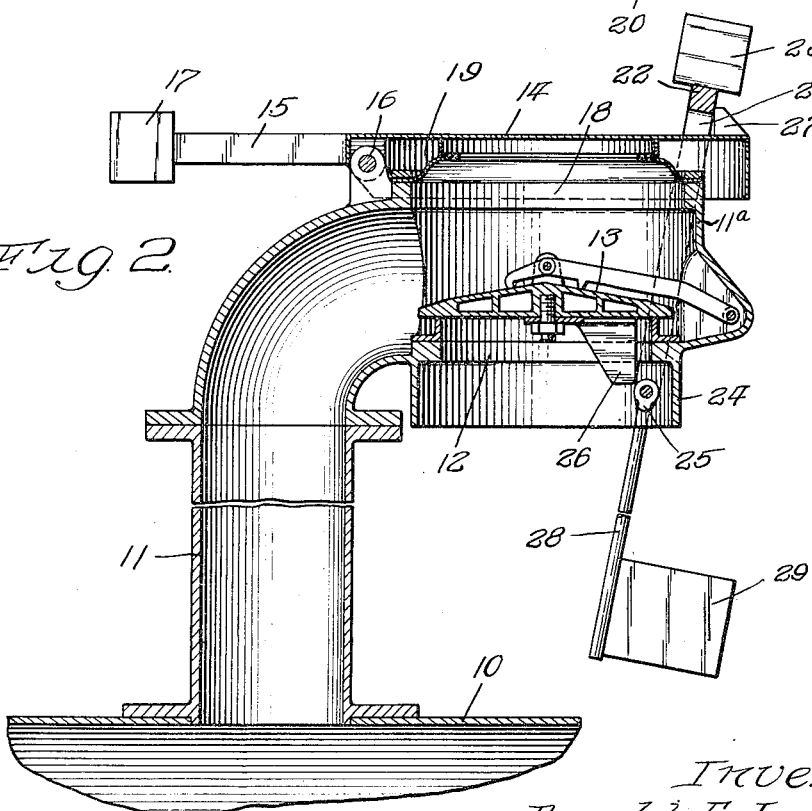
Inventor:
Donald E. Larson,
By Chitten, Wiles, Davies & Hinckel,
Attys.

Patented Feb. 9, 1943

2,310,447

UNITED STATES PATENT OFFICE 2,310,447

VACUUM RELIEF VALVE

Donald E. Larson, Chicago, Ill., assignor to Chicago Bridge & Iron Company, a corporation of Illinois Application February 20, 1942, Serial No. 431,629

2 Claims. (Cl. 137—53)

This invention relates to improvements in relief valves and more especially a valve adapted for use on a pressure container, for example, a storage tank containing gas or volatile liquid.

The relief valve is adapted for use as either a vacuum relief valve or a pressure relief valve; and it is to be understood that in speaking of pressure or excess pressure I mean either positive or negative pressure. Merely by way of example, I have here shown the invention applied to a vacuum relief valve.

In relief valves it is customary to provide a pallet or disk over the vent opening, said disk adapted normally to be unseated by a predetermined pressure in the container. It has been found, however, that occasionally such a disk becomes stuck as a result of freezing or adhesion, or from other causes so that the predetermined pressure will not release it. This is more likely to happen, of course, in cases where the valve has not been operated for some length of time. Serious damage may result in cases where such a valve becomes stuck. The principal feature of my invention is the provision of means for forcibly unseating the valve in case it should become stuck. Such means are adapted to be operated by pressure in the container in excess of the predetermined pressure suitable for normal operation. For example, a vacuum relief valve may be made for normal operation at a predetermined pressure and the means for forcibly unseating it or kicking it loose in the event it becomes stuck may be adapted to operate at a pressure, say, 1 oz. higher than the normal operating pressure. In the case of a vacuum relief valve, of course, this would mean 1 oz. higher negative pressure or 1 oz. less positive pressure.

Other features and advantages will appear more fully as I proceed with the specification.

In that form of device embodying the features of my invention, illustrated in the accompanying drawing, Figure 1 is a top plan view; and Figure 2 is a vertical sectional view taken as indicated by the line 2 of Figure 1.

As shown in the drawing, 10 may indicate the roof of a pressure container having a vent pipe 11 connected to a casing 11a with the vent opening 12. 13 indicates a disk over the opening adapted normally to be unseated by a predetermined pressure (negative) in the container. In normal operation such predetermined pressure will merely lift the disk 13 until sufficient venting has occurred to relieve the excess pressure, and the disk 13 will then close by its own weight. It is made of sufficient weight so that it will normally be lifted whenever the predetermined pressure for venting is reached in the container.

Above the disk 13 I provided a disk 14 carried on one end of the lever 15 which is pivoted at 16. The other end of the lever 15 is provided with a weight 17. The disk 14 is sealed to the opening 18 by flexible fabric 19 so that upward and downward movement is permitted. The opening 18 is also in the vent pipe 11 so that the disk 14 is also exposed to the internal pressure in the container 10. The weight 17 is so set that the disk 14 will not move unless there is pressure in the container in excess of the predetermined pressure adapted for normally unseating the disk 13. For example, if the disk 13 is adapted to be unseated by negative pressure in the container of, say, 4 oz. under atmospheric, the disk 14 may be adapted to be moved by negative pressure in the container of 5 oz. under atmospheric.

20, 20 indicate a pair of levers with their lower ends connected to the rotatable shaft 21. The upper ends of the levers are connected by the strap 22. 23 indicates a weight. The shaft 21 extends through the flange 24 surrounding the vent opening 12. This shaft carries a cam 25 adapted to strike the lug 26 on the disk 13 when the shaft 21 is rotated. The weight 23 is normally somewhat off center as shown in Figure 2, but locked against falling by the catch 27 on the extreme end of the lever 15 beyond the disk 14. When the disk 14 is pulled down, the catch 27 is released from the cross bar 22, permitting the weight 23 to descend, thereby rotating the shaft 21, causing the cam 25 to engage the lug 26 on the disk 13 with great pressure and thereby forcibly unseating said disk against any sticking caused by freezing, adhesion or otherwise.

After the disk 13 has been thus unseated by the weight 23, the parts must be reset by hand. The shaft 21 is also provided with a depending arm 28 carrying a signal flag 29 that is raised when the weight 23 descends, to indicate visually to an attendant that the valve requires reseating.

It is to be noted that the lever arms 20, 20 really serve two functions for the catch 27 may be released manually and the weight 23 lowered by hand to see whether the disk 13 is operating properly.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. A vacuum relief valve, including: a casing with a vent opening to atmosphere; an inwardly opening disk for closing said vent adapted normally to be unseated when a predetermined sub-atmospheric pressure exists in said casing; a cam mounted on the casing adapted to be rotated to engage a part on the disk to unseat the same; means tending to rotate the cam; means normally holding the cam against rotation; and means operated by atmospheric pressure when the pressure in said casing reaches said predetermined sub-atmospheric pressure for releasing said holding means, whereby said cam will rotate and unseat the disk.

2. Apparatus as claimed in claim 1 in which the means for forcibly unseating the disk includes a movable diaphragm exposed to pressure in the casing on one side and to atmospheric pressure on the other side.

DONALD E. LARSON.